United States Patent Office 2,730,201
Patented Jan. 10, 1956

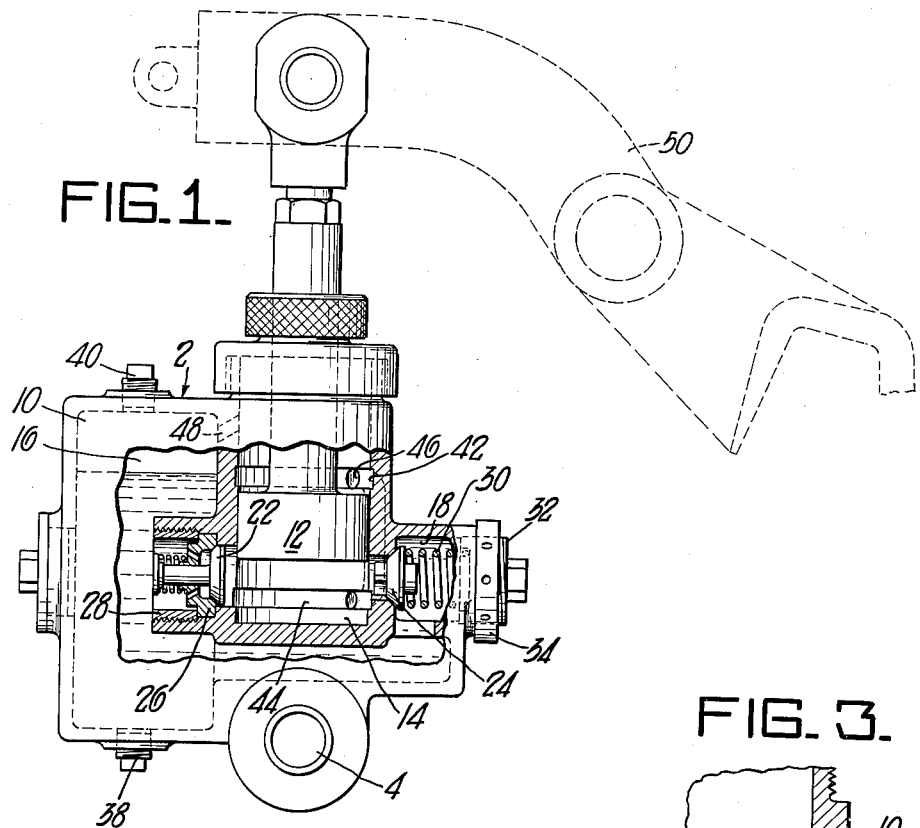
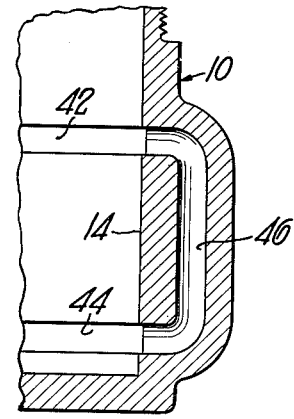
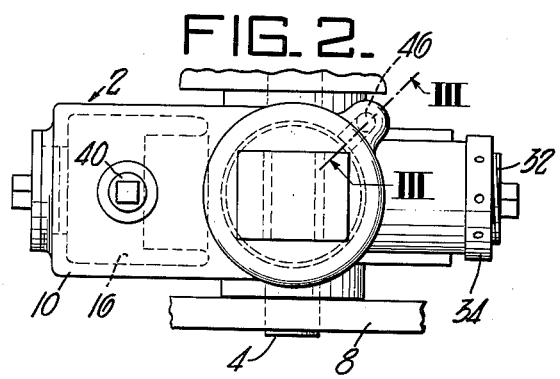
Inventor:
FREDERICK A. MELZER,
by: Donald G. Dalton
his Attorney.

2,730,201

SHOCK ABSORBER

Frederick A. Melzer, Gary, Ind.

Original application January 11, 1947, Serial No. 721,631, now Patent No. 2,598,582, dated May 27, 1952. Divided and this application April 4, 1952, Serial No. 280,586

2 Claims. (Cl. 188—97)

This invention relates to shock absorbing mechanisms for automatic door latching mechanisms and more particularly to a fluid cushioned shock absorber.

In the operation of automatic coke oven door latching mechanisms of the type shown in my copending application Serial No. 721,631, filed January 11, 1947, now Patent No. 2,598,582, of which this application is a division, it is desirable to provide automatic shock absorbing means to cushion certain spring actuated movements therein. Due to the weight and size of such doors, the parts are subjected to rather rough handling and to considerable heat.

Accordingly, it is an object of the present invention to provide a shock absorber suitable for automatic coke oven door latching mechanisms and the like.

It is another object to provide a shock absorber which is simple in design and rugged and durable in design.

The foregoing and further objects will be apparent from the following specification when read in conjunction with the attached drawing, wherein:

Figure 1 is a side elevation with the housing partially broken away to show the interior thereof;

Figure 2 is a plan; and

Figure 3 is an enlarged sectional detail on line III—III of Figure 2.

The shock absorber of my invention designated generally by the numeral 2 is adapted to be pivotally mounted as at 4 on a suitable framework 8. The shock absorber comprises a housing 10 having a piston 12 in a chamber or cylinder 14. Disposed upwardly along one side of the chamber 14 and underneath thereof is an oil chamber or reservoir 16. The reservoir 16 also extends at least part way up the other side of the cylinder providing a valve chamber 18. Oppositely disposed valves 22 and 24 connect the two chambers and the cylinder. Valve 22 seats interiorly of the cylinder chamber 14 so that lifting the piston 12 opens it inwardly to permit oil to be drawn into the cylinder. Valve 22 seats on a combined seat and guide member 26 held in place by a retaining ring 28. Valve 24 seats on the outside of the cylinder and opens to permit oil to flow from the cylinder to the reservoir when the pressure of spring 30 holding the valve closed is exceeded. The adjustment or pressure of the spring is controlled by the nut 32 which is easily adjusted. A lock nut 34 abuts against the frame to keep nut 32 from turning after the desired adjustment is effected. The valves may be replaced by withdrawing nuts 32 and 28, the oil reservoir emptied through drain plug 38 and filled through plug 40.

Grooves 42 and 44 are provided in the walls of cylinder 14 above and below the piston when slightly above its lowermost position. These grooves are connected by a by-pass 46. Thus when the piston has been lifted upwardly and the chamber therebelow filled with oil, the upper groove is covered by the piston so that lowering of the piston is controlled by the valve spring 30. However, as the piston approaches its lowermost position, the upper groove 42 gradually becomes uncovered allowing an increasing amount of oil to pass through the by-pass 46. Thus the pressure within the cylinder is gradually and completely relieved as the piston descends to its lowermost position. A duct 48 connects the upper end of the cylinder 14 and the reservoir 16 so that any oil above the piston will be returned to the reservoir when the piston is lifted. The piston is normally connected to an arm 50 spring biased to hold the piston in its upward position.

Upon compressing the arm 50 to a downward position to automatically release a control or lock mechanism, it is seen that any shock in such release is adjustably controlled by the shock absorber by adjusting the spring load on the valve 24 with the nut 32. The valve 24, therefore, holds the oil in the cylinder until a predetermined pressure is reached when it opens and allows the escape of oil. As the oil escapes the piston 12 moves downward. In its downward movement the piston 12 gradually uncovers the groove 42 permitting oil to flow through the by-pass 46 around the piston 12 to the opposite end of the cylinder. As groove 42 is uncovered, the pressure is relieved and the spring 30 closes the valve 24. However, the oil flowing freely through the by-pass 46 allows rapid travel of the piston 12 and permits quick release of the arm 50.

Due to gravity the piston 12 continues to travel downward and force oil through the by-pass 46 until it reaches the groove 44 which acts as a cushion to slow down and stop the piston 12 without hammer.

On the opposite stroke of the piston, the oil will flow easily through the by-pass and through the valve 22 to fill the space under the piston as it travels to the opposite end of the cylinder. There will be little back pressure of the piston 12 to resist movement of the arm 50 to affect any movements controlled thereby.

While I have shown and described one specific embodiment of my invention, it will be understood that this embodiment is merely for the purpose of illustration and description and that various other forms may be devised within the scope of my invention, as defined in the appended claims.

I claim:

1. A fluid shock absorber comprising a housing, a vertically disposed piston and cylinder and fluid reservoir in said housing, said reservoir extending upwardly adjacent said cylinder, said cylinder having adjacent its lower end a pair of passageways to said reservoir, a suction valve in one of said passageways for admitting fluid from said reservoir to said cylinder when said piston is elevated, a pressure operated valve in the other of said passageways for permitting fluid to pass from said cylinder to said reservoir when said piston is lowered, a pair of peripheral grooves in said cylinder disposed above and below said piston when slightly above its lowermost position and a duct connecting said grooves whereby fluid may flow from below to above said piston to relieve the pressure in said cylinder as the piston approaches its lowermost position.

2. A fluid shock absorber comprising a housing, a vertically disposed piston and cylinder and fluid reservoir in said housing, said reservoir extending upwardly adjacent said cylinder, said cylinder having adjacent its lower end a pair of passageways to said reservoir, a suction valve in one of said passageways for admitting fluid from said reservoir to said cylinder when said piston is elevated, a pressure operated valve in the other of said passageways for permitting fluid to pass from said cylinder to said reservoir when said piston is lowered, a by-pass duct connecting the upper and lower portion of said cylinder, the upper end of said duct being closed by said piston in the upper portion of its travel and open when the piston approaches its lowermost position, the lower end of said duct being open except when the piston is in its lowermost position whereby fluid may freely flow from below to above said piston to relieve all pressure in said cylinder as the piston approaches its lowermost position.

References Cited in the file of this patent

UNITED STATES PATENTS

| | | |
|---|---|---|
| 1,310,199 | Manton | July 15, 1919 |
| 1,561,810 | Weeks | Nov. 17, 1925 |
| 1,963,430 | Zarafu | June 19, 1934 |

FOREIGN PATENTS

| | | |
|---|---|---|
| 19,263 | Great Britain | Aug. 27, 1907 |